US006347688B1

(12) United States Patent
Hall et al.

(10) Patent No.: US 6,347,688 B1
(45) Date of Patent: Feb. 19, 2002

(54) WHEEL CHAIR ROLLBACK STOP

(76) Inventors: Steven R. Hall; Janet C. Hall, both of 24 Woodland Heights, Wales, MA (US) 01081

( * ) Notice: Subject to any disclaimer, the term of this patent is extended or adjusted under 35 U.S.C. 154(b) by 0 days.

(21) Appl. No.: 09/861,447

(22) Filed: May 18, 2001

(51) Int. Cl.$^{7}$ .................................................. B62M 1/14
(52) U.S. Cl. .......................... 188/5; 188/2 F; 280/304.1
(58) Field of Search ............................ 280/304.1, 250.1; 188/2 F, 5

(56) References Cited

U.S. PATENT DOCUMENTS 6,047,979 A * 4/2000 Kraft et al. .............. 280/250.1
6,092,824 A * 7/2000 Ritchie et al. ........... 280/304.1
6,224,156 B1 * 5/2001 Fleigle .................... 297/354.1

* cited by examiner

*Primary Examiner*—Christopher P. Schwartz
(74) *Attorney, Agent, or Firm*—James F. Baird

(57) ABSTRACT

A New and improved stabilizer for use in conjunction with a wheelchair is disclosed. The device incorporates a multi part lever mechanism that is activated when no patient is seated on the seat area of the wheelchair, when the patient is preparing (or being assisted) to sit on the seat area and the patients weight is not fully pressing on the seat area, or the patient is getting up (or being assisted) from the seat area of the wheelchair and the patients weight pushing on the seat area is being reduced. The lever mechanism is deactivated when the seat area of the wheelchair is depressed by the patients weight. When the lever mechanism is activated a plurality of posts with tips that include friction means are pressed against the ground preventing the wheelchair from freely rolling in a backward direction.

2 Claims, 4 Drawing Sheets

WHEEL CHAIR ROLLBACK STOP

CROSS REFERENCES TO RELATED APPLICATION(S)

This Application is the formal application for the invention that was described in Document Disclosure No. 477543 filed Jul. 27, 2000.

BACKGROUND

The field of our invention is mechanisms for stabilizing wheelchairs, in particular mechanisms that prevent a wheelchair from moving in a backward direction when the patient is either entering or exiting the wheelchair. More particularly our invention relates to manual wheelchairs and not motorized wheelchairs. In the past wheelchairs were traditionally equipped with manually operated brakes that prevented the wheels from moving. These manual brakes required that the patient or assistant remember to engage the brakes prior to the patient either entering, or exiting, the wheelchair. The lever that controls the manual brakes were within easy reach of the patient. However the patient, or the assistant, could easily forget to engage the brake with the wheelchair rolling out from under the patient if the patient tried to exit the chair alone. The resulting fall could be harmful or even fatal. The same result could occur if the brakes were not engaged prior to the patient trying to enter the wheelchair. With patients that have diminished capacity the possibility is always present that the patient could disengage the brake and forget. There have been several inventions that have attempted to overcome this problem using locks that are engaged on the wheels when the patients weight is partially removed from the seat area. The disadvantage with these inventions is that they require major modifications to existing wheelchairs and in many instances cannot be used to modify so called standard wheelchairs. These inventions are also flawed in that the wheelchair may easily flip over backward during the patients entry or exit as the patient places his/her weight on the back portion of the armrests.

The uncontrolled movement of the wheelchair in a backward direction when the patient is either entering or exiting the wheelchair is the greatest danger and the specific risk that the present invention attempts to overcome. Due to the restriction of backward movement that results when the patients weight is partially or fully removed from the seat area of a wheelchair a bypass mechanism is required in order that the wheelchair may be easily moved when empty.

The present invention provides an improved wheelchair stabilizer that prevents the wheelchair from moving in a backward direction when the patient is either entering or exiting the wheelchair.

An object of the invention is to provide a wheelchair stabilizer that may be easily and inexpensively adapted to existing wheelchairs.

A further object of the invention is to provide an improved wheelchair stabilizer that provides for a pressure activated bypass mechanism that permits easy movement of the wheelchair when empty and further that the bypass mechanism return to neutral when not pressurized.

SUMMARY OF THE INVENTION

The invention portrayed is an improved Wheelchair Rollback Stop for wheelchairs, of the type typically used on wheelchairs that are utilized by patients at nursing homes and hospitals.

The invention is a new and improved wheelchair stabilizer that prevents a wheelchair from moving in a backward direction when the patient is either entering or exiting the wheelchair.

The present invention is an improvement on current wheelchair safety devices. Our invention prevents a wheelchair from rolling backward as the occupant attempts to enter or exit the wheelchair. This device is necessary because many patients with cognitive loss and who suffer from stokes cannot be taught to lock their wheelchairs prior to entering or exiting the wheelchair. This leads to falls, many with injury to the patient. The improvements we made are as follows: 1. Prevents the wheelchair from rolling backwards when entering, as well as exiting, the wheelchair; 2. Stronger and more durable, because our device stops the wheelchair with the use of two levers, one on each axle, that apply pressure to the floor rather than the wheels. This design allows the device to be manufactured out of much thicker material than other similar devices; 3. Our device does not prevent the wheelchair from folding, for easy transport and storage. 4. Our device is safer because all components are under the wheelchair out of reach of the occupant and nearby patients.

The uncontrolled movement of the wheelchair in a backward direction when the patient is either entering or exiting the wheelchair is the greatest danger and the specific risk that the present invention attempts to overcome. Due to the restriction of backward movement that results when the patients weight is partially or fully removed from the seat area of a wheelchair a bypass mechanism is required in order that the wheelchair may be easily moved when empty. The bypass mechanism that is included in the invention is hand pressure activated that permits easy movement of the wheelchair when empty and further provides that the bypass mechanism return to neutral when not pressurized. Other bypass mechanisms could easily be used.

All component parts are out of reach of the patient thereby eliminating the possibility of the stabilizer being deactivated by the patient.

The invention incorporates a multi part lever mechanism that is activated when no patient is seated on the seat area of the wheelchair, when the patient is preparing (or being assisted) to sit on the seat area and the patients weight is not fully pressing on the seat area, or the patient is getting up (or being assisted) from the seat area of the wheelchair and the patients weight pushing on the seat area is being reduced. The lever mechanism is deactivated when the seat area of the wheelchair is depressed by the patients weight. When the lever mechanism is activated a plurality of posts with tips that include friction means are pressed against the ground preventing the wheelchair from freely rolling, in particular in a backward direction. The wheelchair will roll forward in a normal manner.

The invention may be easily added to modify existing wheelchairs. The axle bolts of the unmodified wheelchairs are removed and longer bolts are substituted. The longer bolts act as a fulcrum. Bearings that are sized and shaped to fit on the bolts are fixedly attached to the major members of the levers, the major members are tubular. Rod like members that are bent at an angle are sized and shaped to have a first end slideably fit within the first end of the tubular major members. Cane tip members with friction tips, on one end, are sized and shaped to have the non tip end slideably fit within the second end of the tubular major members. The usual configuration has a right side lever and a left side lever. The left rod like member and right rod like member are positioned in order that their second ends are positioned beneath the seat area of the wheelchair. A plurality of springs are positioned in order to force the left and right rod like members against the bottom of the seat area. A plurality of adjustable stops are attached to the right side and left side lever. Th e adjustable stops are positioned to come in contact with a frame member of the wheelchair frame in order that the upper movement of the left and right rod like member may be restricted. These two components result in the activation position of the lever being adjusted for the individual user of the wheelchair. The cane tip members make contact with the ground when the lever is in the activation position. The cane tip members are angled against the ground in order that resistance is increased when the wheelchair moves in a backward direction. A pressure activated bypass is provided that has a cable attached to the tubular major member of the lever. The cable is attached at a point between the cane tip member and the bearing and travels thru a bracket that is positioned on a frame member of the wheelchair that is above the tubular major member. As pressure is applied to a hand grip the cable is shortened resulting in the tubular major member being raised off the ground. When pressure is released from the hand grip the tubular major member is allowed to return to be in contact with the ground While the invention will be discussed in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

BRIEF DESCRIPTION OF THE DRAWINGS

Turning first to FIG. 1 there is shown the present invention, WHEELCHAIR ROLLBACK STOP.

DESCRIPTION OF THE PREFERRED EMBODIMENT

The invention is a new and improved wheelchair stabilizer that prevents a wheelchair from moving in a backward direction when the patient is either entering or exiting the wheelchair.

Figure 1:
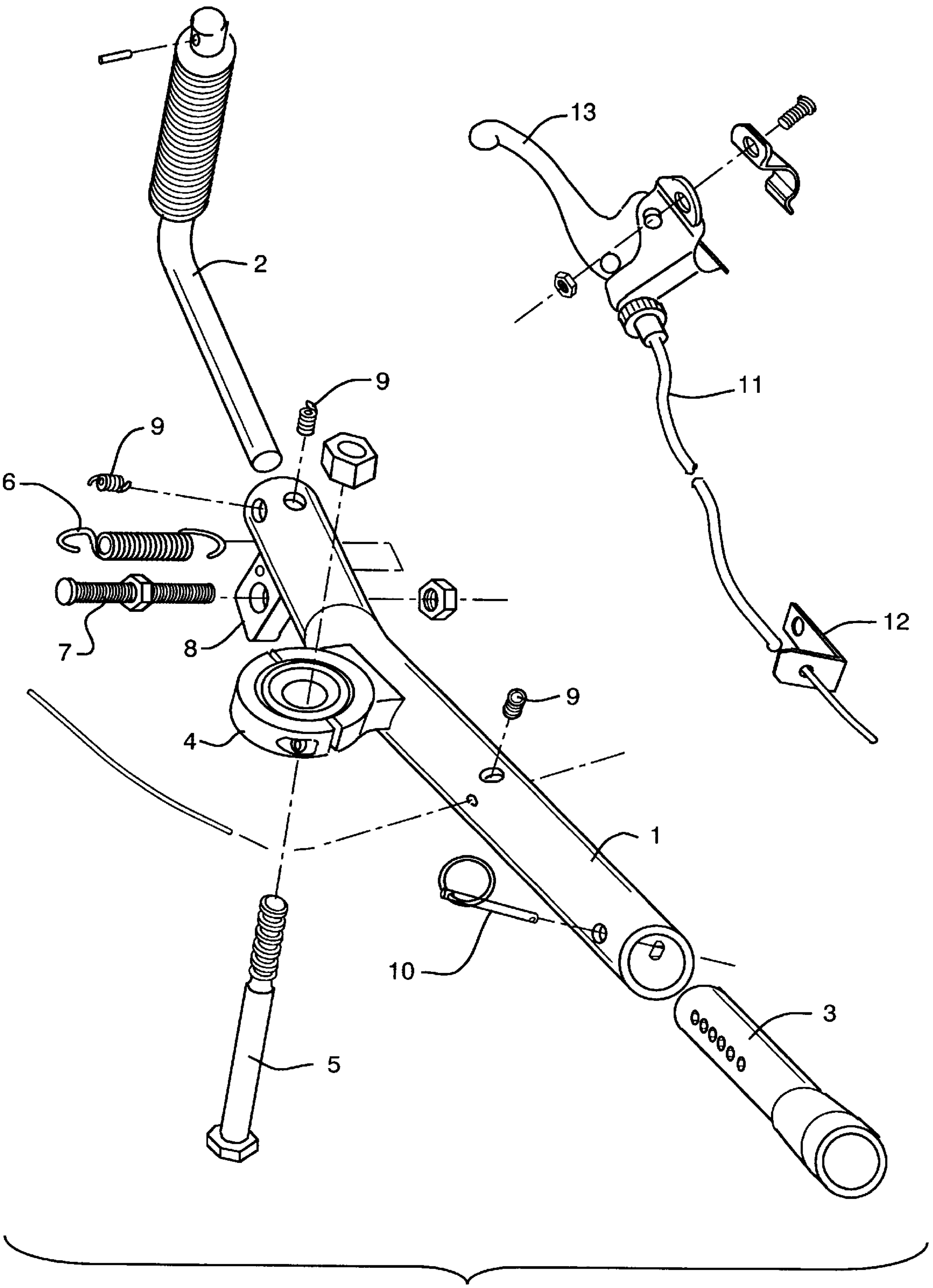
FIG. 1 is an exploded view. Shown are Tubular Major Member 1., Rod Bent Member 2., Cane Tip Member 3., Bearing 4., Extended Axle Bolt 5., Spring 6., Adjustable Stop 7., Attachment Bracket 8., Lock Screws 9., and Lock Pin 10. Also shown is Pressure Activated Bypass, in an exploded view indicating Partially Shielded Cable 11., Bracket 12., and Hand Grip 13.

Turning to FIG. 1 the present invention can be seen in an exploded view. Shown are Tubular Major Member 1., Rod Bent Member 2., Cane Tip Member 3., Bearing 4., Extended Axle Bolt 5., Spring 6., Adjustable Stop 7., Attachment Bracket 8., Lock Screws 9., and Lock Pin 10. Also shown is Pressure Activated Bypass, in an exploded view indicating Cable 11., Bracket 12., and Hand Grip 13.

Figure 2:
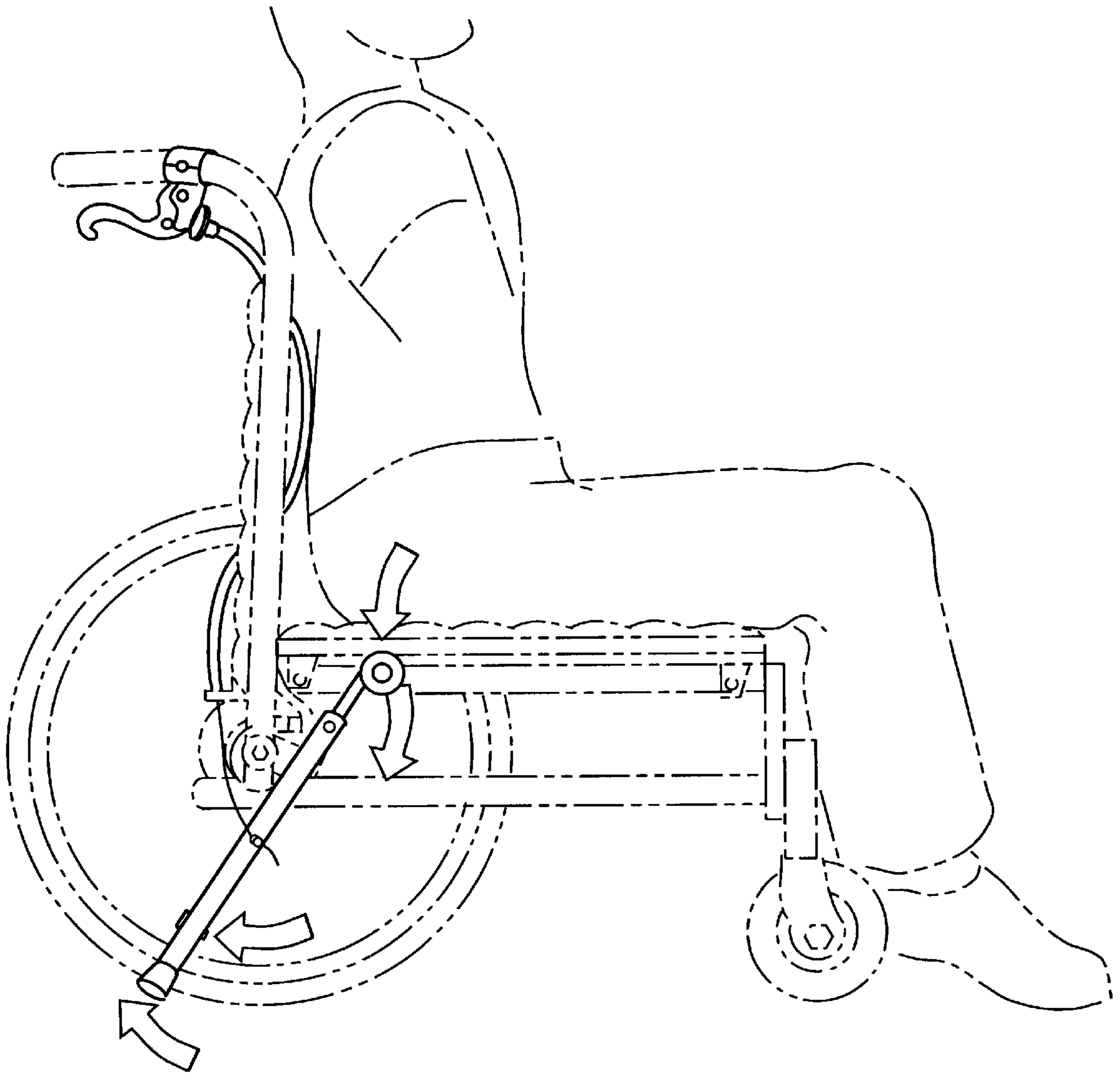
Turning to FIG. 2 the present invention is shown attached to a wheelchair. The view is from the left side of the wheelchair with the left wheel and left frame member portions of the wheelchair not shown. The invention is shown with a patient in a seated position thereby deactivating the Wheelchair Rollback Stop.

Turning to FIG. 2 the present invention is shown attached to a wheelchair. The view is from the left side of the wheelchair with the left wheel and left frame member portions of the wheelchair not shown. The invention is shown with a patient in a seated position thereby deactivating the Wheelchair Rollback Stop.

Figure 3:
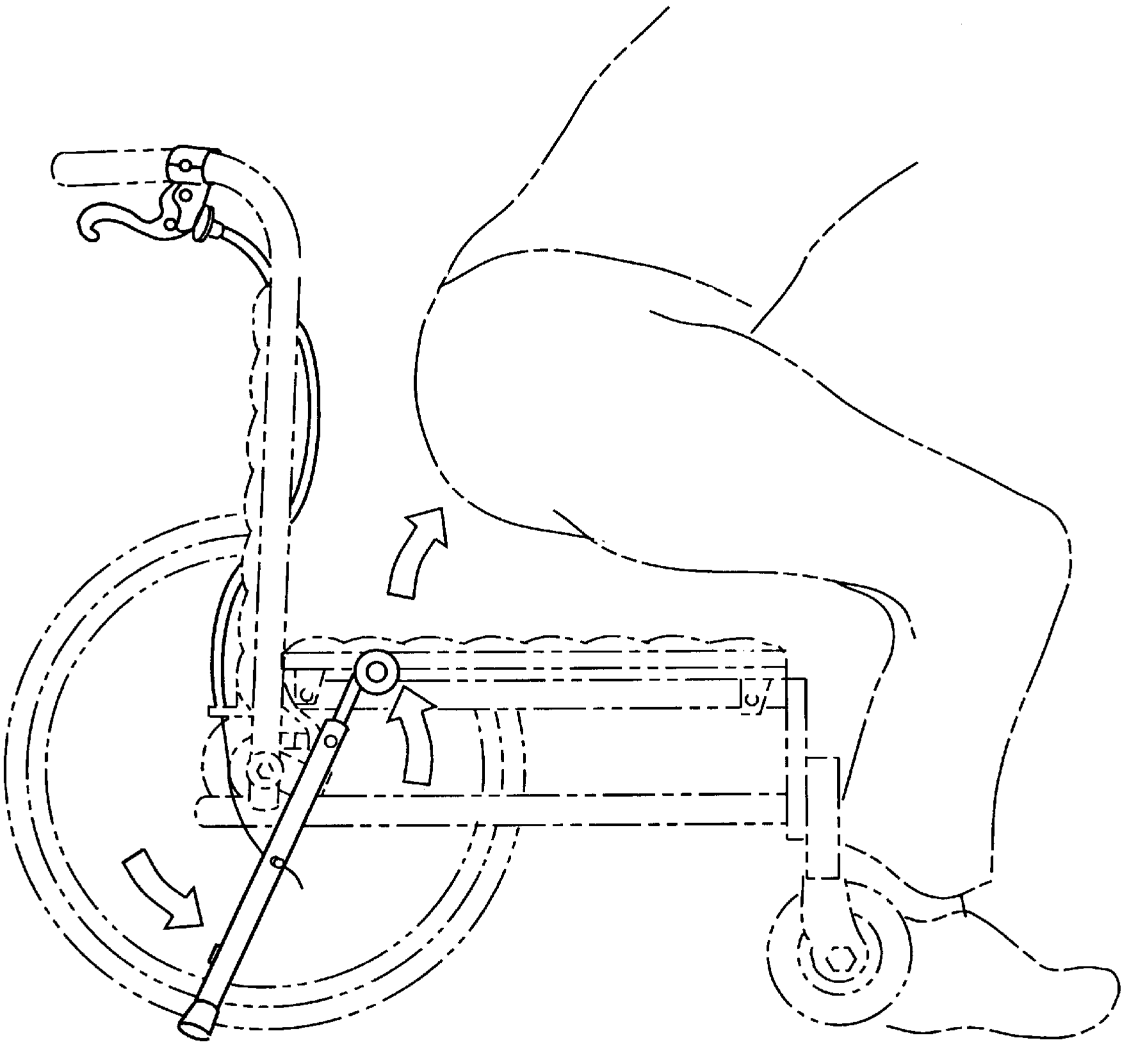
FIG. 3. shows the invention attached to a wheelchair. The view is from the left side of the wheelchair with the left wheel and left frame member portions of the wheelchair not shown. The invention is shown with a patient in an unseated position thereby activating the Wheelchair Rollback Stop.

FIG. 3. shows the invention attached to a wheelchair. The view is from the left side of the wheelchair with the left wheel and left frame member portions of the wheelchair not shown. The invention is shown with a patient in an unseated position thereby activating the Wheelchair Rollback Stop.

Figure 4:
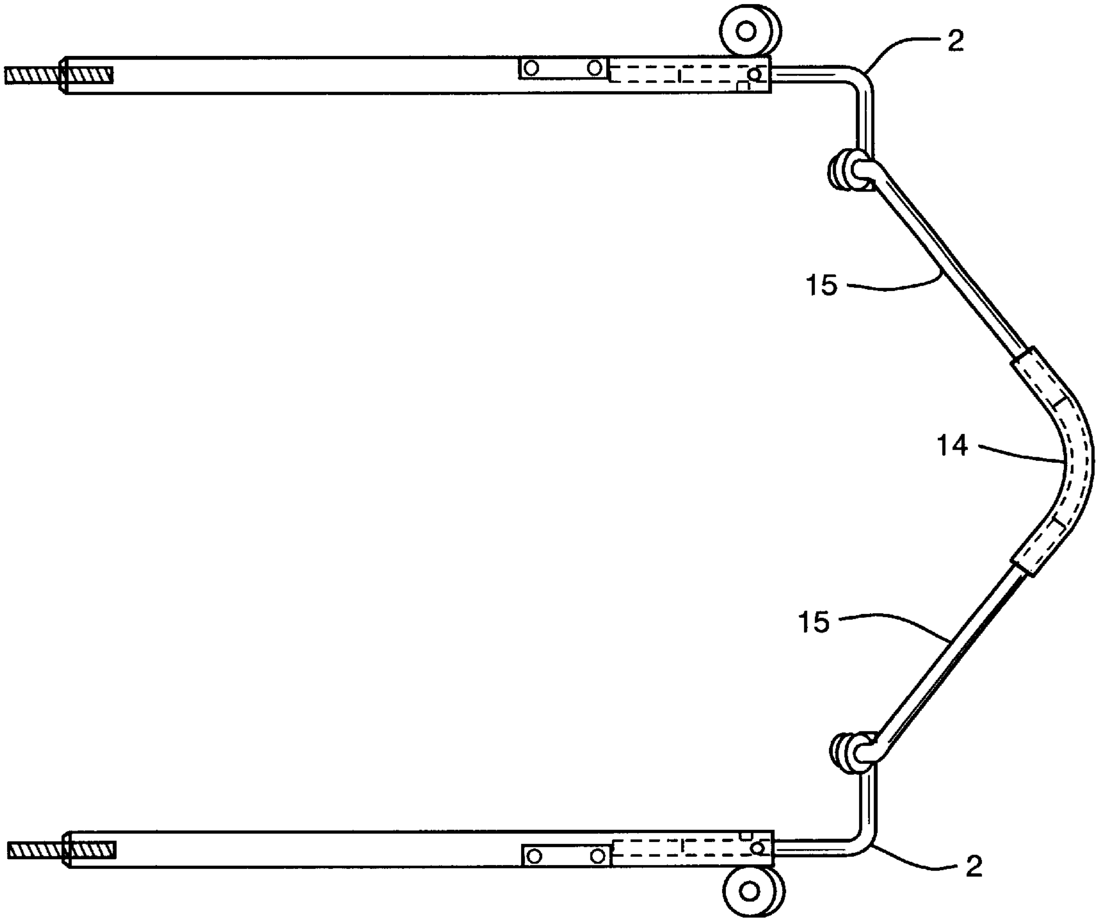
FIG. 4. shows the invention in an assembled configuration, in this configuration the Bent Rod Members 2., are shown joined by means of a flexible tubing 14., and two rod extenders 15.

FIG. 4. shows the invention in an assembled configuration, in this configuration the Bent Rod Members 2., are shown joined by means of a flexible tubing 14., and two rod extenders 15.

As can be seen the patients own weight acts to either activate or deactivate the invention when the patients weight is partially removed from the seat the cane tip members 3. make frictional contact with the ground thereby restricting any movement of the wheelchair in a backward direction. The springs act to keep the rod bent members firmly against the bottom of the seat thereby insuring that the rod bent members will move in an upward direction when the patients weight is even slightly removed from the seat. The adjustable stops are used restrict the further upward movement of the rod bent members beyond a desired point and at the same time insure that the cane tip members make firm frictional contact with the ground when the invention is activated.

The Pressure Activated Bypass is used to raise the Cane Tip Members when a wheelchair is empty for ease of movement particularly in a backward direction. When the Hand Grip is squeezed the cable is shortened and the cane tip members are raised from the floor. Upon release the cable is returned to its' original configuration and the cane tip members once again are in frictional contact with the floor, unless a patient is seated in the wheelchair.

From the foregoing description it will be apparent that modifications can be made to the apparatus without departing from the teaching of the present invention. Accordingly, it is distinctly understood that the invention is not limited to the preferred embodiment but may be embodied and practiced within the scope of the following claims.

We claim:

1. New and improved Wheelchair Rollback Stop apparatus for use with a wheelchair, having a frame, a seat and wheels, that are secured to the frame by means of bolts, said wheelchair bolts having a length and an outer diameter, comprising:

a.) a plurality of tubular major members, said tubular major members having a first end, a middle section and a second end, said tubular major members having a bend at the middle section, said tubular major members having threaded holes situated at the first end, said tubular major members having holes situated and at the second end, said tubular major members having an attachment bracket situated between the middle section and the first end, said attachment bracket having at least two holes therethru with one having internal threads and one having a smooth internal wall;

b.) a plurality of rod bent members, said rod bend members having a primary end, a mid section and a secondary end, said rod bent members having a series of holes at the primary end, said rod bent members are bent at an angle at the mid section, said primary end being sized and shaped to have the primary end slideably fit within the first end of the tubular major members;

c.) a plurality of cane tip members, said cane tip members having a friction tip end and a nonfriction tip end, said cane tip members having a series of holes at the nonfriction tip end, said nonfriction tip end being sized and shaped to have the nonfriction tip end slideably fit within the second end of the tubular major members;

d.) a plurality of bearings, said bearings having an inner diameter and an outer diameter, said inner diameter being sufficient to frictionally accept the wheelchair bolts, one bearing being fixedly attached, at the bearings outer diameter, to each tubular major member at the bend at the tubular major member middle section;

e.) a plurality of elongated bolts, said elongated bolts having a length and an outer diameter, said elongated bolts length exceeding the length of the wheelchair bolts, the length of said elongated bolts being sufficient to extend thru the wheelchair wheel, the wheelchair frame, the bearing and beyond a predetermined distance, said elongated bolts diameter being sufficient to not exceed the inner diameter of the bearings and at the same time sufficient to be frictionally engaged within the inner diameter of the bearings;

f.) a plurality of springs with hooked ends, sized and shaped in order that one hooked end will fit thru one of the smooth walled holes in the tubular major member attachment bracket and the other hooked end will engage the wheelchair frame at a desired point;

g.) a plurality of adjustable stops, said adjustable stops being threaded members with a top end, a mid section and a bottom end, said adjustable stops being sized and shaped to frictionally fit within the threaded hole in the tubular major member attachment bracket, said adjustable stops being a predetermined length in order to be of sufficient length to engage with the wheelchair frame at a desired position;

h.) a plurality of lock screws sized and shaped to frictionally secure the rod bent members primary end, in a desired position, within the tubular major member first end, when inserted thru the threaded holes in the tubular major member first end and secured against the rod bent member primary end; and i.) a plurality of lock pins sized and shaped secure the cane tip members in a desired position when inserted thru the holes in the second end of the tubular major member second end and the appropriate holes in the cane tip members nonfriction tip end.

2. New and improved Wheelchair Rollback Stop apparatus for use with a wheelchair, having a frame, a seat and wheels, that are secured to the frame by means of bolts, said wheelchair bolts having a length and an outer diameter, as described in claim 1 further comprising:

a.) said Tubular Major Member second end having additional holes therein at least one being threaded and two being unthreaded;

b.) a Hand Grip suitable for attachment to the wheelchair frame suitable for attaching a partially shielded cable;

c.) a Bracket with a hole therein;

d.) a Partially Shielded Cable that has a first end and a second end, said first end being shielded, said shielding having a first end and a second end, said shielding first end being sized and shaped to be fixedly attached to said Hand Grip, said Partially Shielded Cable second end being without shielding and sized and shaped to fit slideably thru the two unthreaded holes in the Tubular Major Member and also thru the hole in said Bracket, said hole in said Bracket being sized and shaped to permit the Partially Shielded Cable second end without shielding to slide therethru without resistance and further being sized and shaped to permit the shielding second end to be fixedly attached thereto; and e.) a lock screw being sized and shaped to fit frictionally in the additional threaded hole in Tubular Major Member and further to securely engage the Partially Shielded Cable against the Tubular Major Member.

* * * * *